Figure 1B:
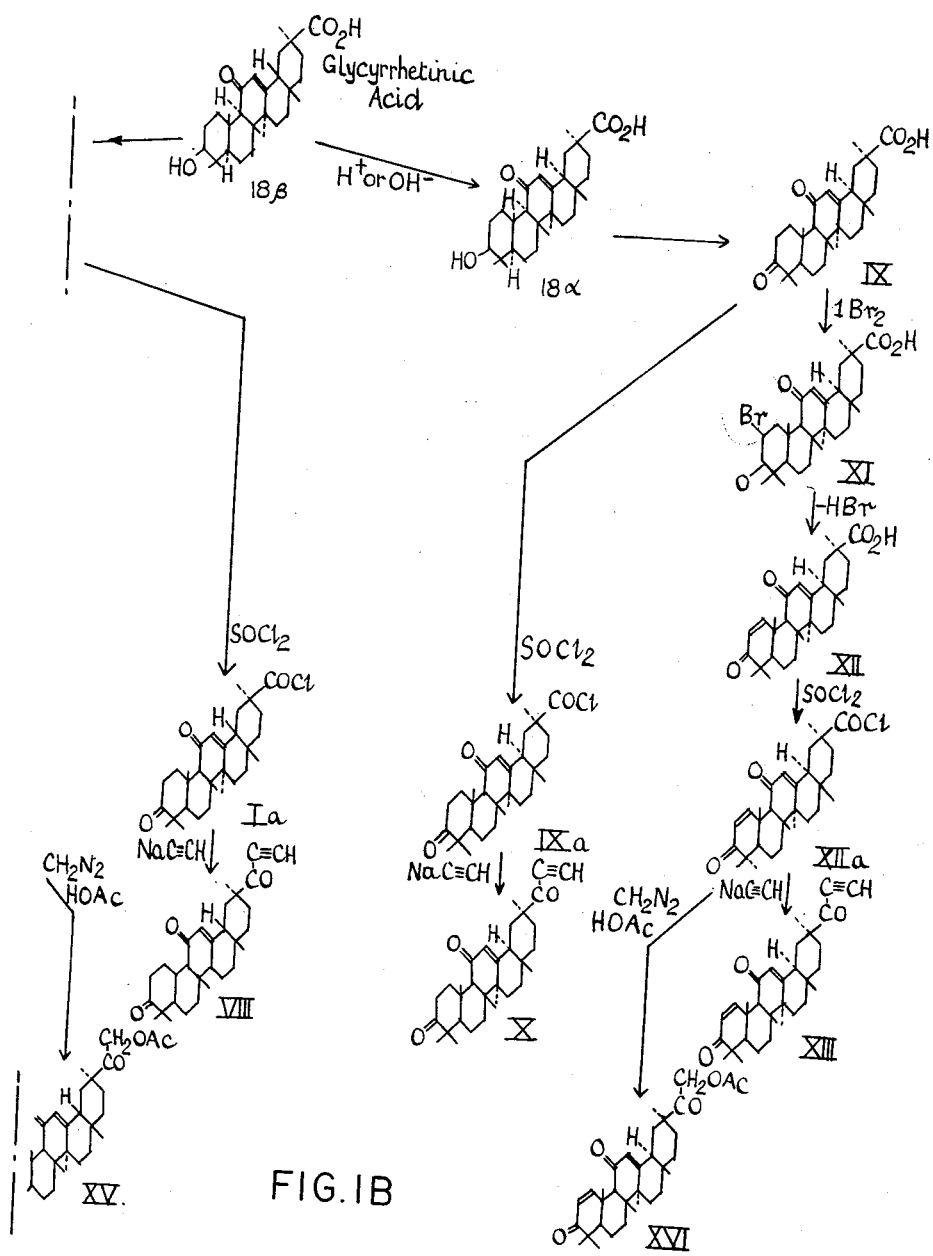

April 2, 1963    S. GOTTFRIED ET AL    3,084,185
GLYCYRRHETINIC ACID DERIVATIVES
Filed July 21, 1960
2 Sheets-Sheet 1
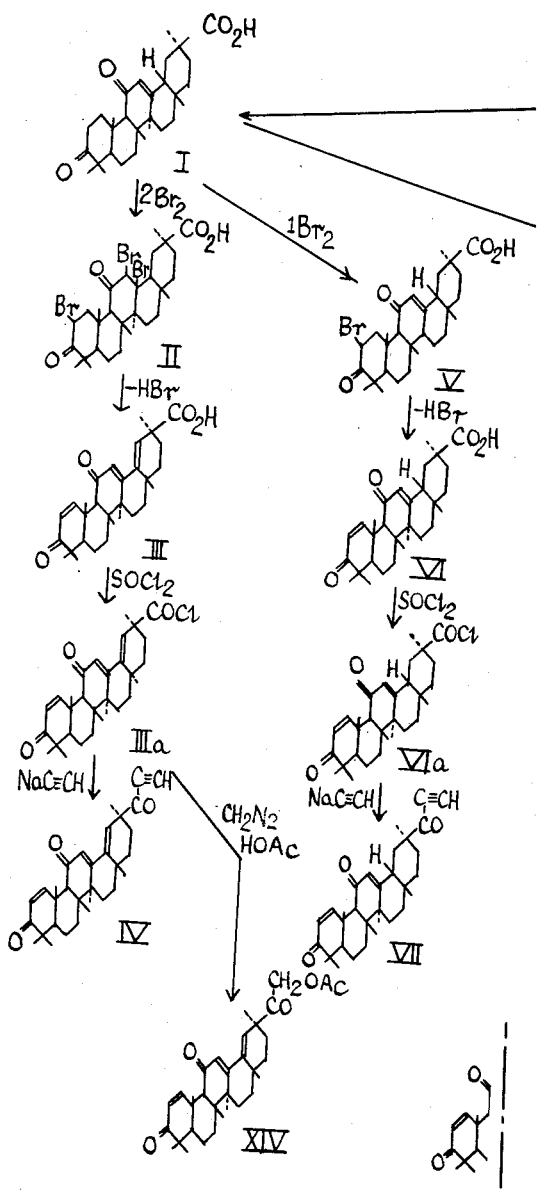
FIG.IA
Inventors:
Siegfried Gottfried and
Lily Baxendale;
By their attorneys,
Baldwin & Wight April 2, 1963    S. GOTTFRIED ET AL    3,084,185
GLYCYRRHETINIC ACID DERIVATIVES
Filed July 21, 1960    2 Sheets-Sheet 2

Inventors:
Siegfried Gottfried and
Lily Baxendale;
By their attorneys,
Baldwin & Wight United States Patent Office 3,084,185
Patented Apr. 2, 1963

3,084,185
GLYCYRRHETINIC ACID DERIVATIVES
Siegfried Gottfried, Ilford, and Lily Baxendale, London, England, assignors to Biorex Laboratories Limited, London, England, a corporation of the United Kingdom
Filed July 21, 1960, Ser. No. 44,412
Claims priority, application Great Britain July 24, 1959
21 Claims. (Cl. 260—488)

The present invention is concerned with new and therapeutically useful derivatives of glycyrrhetinic acid.

It is known from copending application, Ser. No. 645,898, filed March 14, 1957, and now abandoned, that glycyrrhetinic acid either alone or in combination with one or more anti-causative substances is a useful therapeutic agent not only for the treatment of inflammatory conditions but also for the treament of a large variety of skin diseases and pruriginous skin conditions.

Various esters and hemi-esters of glycyrrhetinic acid are mentioned in copending application Serial No. 744,133, filed June 26, 1958, and now U.S. Patent 2,915,825, and, in addition, various other therapeutically useful derivatives of glycyrrhetinic acid are mentioned in copending applications, Serial No. 742,706, filed June 18, 1958, and Serial No. 771,182, filed November 3, 1958.

We have now found that when glycyrrhetinic acid is chemically treated in such a manner that double bonds are introduced therein or that halogen atoms or ethinyl groups are introduced therein, a potentiation of activity takes place. Such glycyrrhetinic acid derivatives have the same field of therapeutic application as the glycyrrhetinic acid derivatives described and claimed in the aforesaid copending applications, Serial Nos. 744,688; 742,706; and 771,182.

Thus, according to the present invention, there are provided glycyrrhetinic acid derivatives of the general formula:

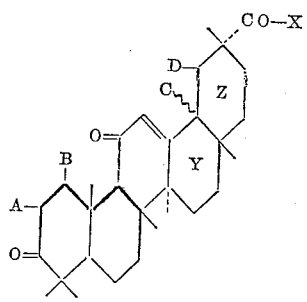

wherein A, B, C and D are hydrogen atoms or A and B and/or C and D can together represent a further bond and X is a hydroxyl, ethinyl or acyl-oxymethyl (—CH$_2$.O.acyl) radical.

It should also be explained that the two rings Y and Z in the above-given general formula may be joined in the cis-or trans-position. The trans-compounds are hereinafter referred to as the 18α-compounds and the cis- compounds are referred to as the 18β-compounds.

3,11-diketo-18α- and 18β-olean-12-en-20-carboxylic acids, herein referred to as 18α- and 18β-keto G.A. respectively, have already been prepared by Logemann et al. (Ber. 90, 603/1957) from 3-hydroxy-11-keto-18β-olean-12-en-20-carboxylic acid (i.e., glycyrrhetinic acid). However, the method used by Logemann et al. does not give very high yields and according to a further feature of the present invention processes are provided for the production of 18α- and 18β-keto G.A. which give high yields of high purity.

18α- and 18β-keto G.A. can be monohalogenated in the usual manner, such as by dissolving 18β keto G.A. in an inert organic solvent and adding one molecular equivalent of halogen. In this case halogenation takes place at the 2-position.

The tri-halogen derivative can be prepared in a similar manner, i.e., by treating the 18α- and 18β-keto G.A. in an inert organic solvent with 2 molecular equivalents of halogen and, in this case, not only is a halogen atom substituted in the 2-position but two halogen atoms are also added across the 12,13-double bond. This tri-halogen derivative is also new. It will be understood, however, that in the case of the trihalogenation of 18α- and 18β-keto G.A., the same compound is obtained.

These halogen derivatives can be dehydrohalogenated in a known manner, for example, by treatment with a basic reagent, such as pyridine. In the case of the dehydrohalogenation of the mono-halo compounds, a double bond is formed in the 1,2-position. Thus, the mono-halo-18α-keto G.A. and the mono-halo-18β keto G.A. give rise to Δ$^1$-18α-keto G.A. and Δ$^1$-18β-keto G.A., respectively.

When the trihalo derivatives are dehydrohalogenated, not only is a double bond formed in the 1,2-position but the double bond in the 12,13-position is reformed and a further double bond is formed in the 18,19-position. Thus, the trihalo-18β-keto G.A. gives rise to Δ$^{1,18}$-keto G.A.

The 20-carboxylic acid group in Δ$^1$-18β-keto G.A. and in Δ$^1$-18α-G.A., as well as in 18α-keto G.A. and 18β-keto G.A., may be converted into the corresponding acid chloride group by reaction with, for example, thionyl chloride or, better oxalyl chloride, preferably at elevated temperatures. The resulting 20-acid chlorides are valuable intermediates in the preparation of further derivatives, particularly for the preparation of the corresponding ethinyl derivatives.

These ethinyl derivatives are prepared in a known manner by the reaction of the 20-acid chloride with, for example, sodium acetylide in an inert solvent, such as benzene.

The acyloxy-methyl compounds may be prepared from the 20-acid chloride, by reacting the acid chloride with diazomethane and the diazoketone thereby obtained then reacted with the desired carboxylic acid, such as acetic acid.

In order to facilitate the understanding of the various processes with which the present application is concerned, reference is made to the accompanying drawing showing the reaction scheme.

The following Examples 7, 8, 10 and 11 are given for the purpose of illustrating the present invention and Examples 1–6 and 9 for the purpose of illustrating the preparation of intermediates, the Roman numerals referring to the structural formulae in the accompanying drawings:

Example 1.—Preparation of 3,11-Diketo-18β-Olean 12-En-20-Carboxylic Acid (18β-Keto G.A.) (I)

23.5 g. 18β-glycyrrhetinic acid are dissolved in a mixture of 100 cc. glacial acetic acid and 100 cc. alcohol-free chloroform and 5 g. chromic anhydride dissolved in 25 cc. glacial acetic acid and 5 cc. water carefully mixed therewith. The temperature of the reaction mixture is not allowed to rise above 30° C. After a period of three hours, 10 cc. methanol are added, the mixture reduced to a small volume by evaporation under reduced pressure, 4 times the volume of water is added thereto, the precipitate obtained is dried and then dissolved in a solution of 75 cc. 2 N sodium hydroxide in 100 cc. water and 100 cc. industrial methylated spirit, boiled and filtered. (The technique of boiling to alkaline solution of the product, after removal of acetate ions, results in the decomposition of soluble chromium compounds, which otherwise impair the subsequent crystallisation, to give the insoluble chromic oxide which is completely removed by filtration.) After acidification of the solution obtained, 2.05 g. crude 18β-keto G.A. (I) are obtained. This crude compound is dissolved in a mixture of 200 cc. methanol and 125 cc. chloroform, evaporated down a little, if necessary, and allowed to crystallise in an ice chest (M.P. 295° C.).

As stated above, the method of preparing 18β-keto G.A. according to the present invention is superior to that described by Logemann et al. in that the yield is higher and the product obtained is considerably purer, i.e., in this example the yield of pure product was 19 g. (80–81% yield) whereas Logemann's yield was 70–71%.

*Example 2.—Preparation of 3,11-Diketo-18β-Olean-12-En-20-Carboxylic Acid (18β-Keto-G.A.) (I)*

A solution of 5 g. chromic anhydride in 5 cc. water and 25 cc. glacial acetic acid is added slowly to a cold stirred solution of 23.5 g. 18β-G.A. in 250 cc. glacial acetic acid. The temperature of the reaction mixture is not allowed to rise above 25–30° C. After standing for about 12 hours, the mixture is heated on the steam bath to about 80° C. for 15 minutes and 10 cc. methanol then added. The mixture is poured into about one litre water, the precipitated filtered off with suction, dried first at 100° C. and then in vacuo over potassium hydroxide. This ensures that all the acetic acid is removed. A powdery green solid is obtained.

The precipitate is then mixed with 200 cc. methylated spirit, 100 cc. water and 50 cc. 2 N aqueous sodium hydroxide and the suspension obtained digested on a steam bath for 30 minutes. This process brings all the 18β-keto-A.G. into solution and precipitates all the chromium as chromium hydroxide ($Cr(OH_3)$). The hot alkaline solution is filtered and the filtrate poured into 1 litre water containing 100 cc. 2 N aqueous hydrochloric acid. A white precipitate of crude 18β-keto-G.A. is immediately thrown down. This precipitate is filtered off with suction and dried. The dry crude product amounts to 21 g. It is purified by dissolving in a mixture of 200 cc. methanol and 125 cc. chloroform, evaporating the solution down, if necessary, and allowing to crystallise. Repeated recrystallisation and working up of the mother liquors gives 19 g. (81% of theory) pure 18β-keto-G.A. in the form of colourless rhomboidal crystals of M.P. 295° C.; $[\alpha]_D^{20} = +184°$ in chloroform (C=1).

*Example 3.—Preparation of 3,11-Diketo-18α-Olean-12-En-20-Carboxylic Acid (18α-Keto-G.A.) (IX)*

53 g. 18α-G.A. is suspended in 1500 cc. glacial acetic acid in a round-bottomed flask. A soxhlet extractor containing 8.0 g. chromic anhydride in a Gooch crucible is placed in the neck of the flask and the glacial acid mixture boiled under reflux at reduced pressure, the temperature not being allowed to rise above 40° C. After 8 hours, the mixture is poured into 5 litres water and the resulting suspension filtered. The precipitate is dried at 100° C. and then in vacuo over potassium hydroxide.

The solid product is then digested on the steam bath for 30 minutes in a mixture of 75 cc. 2 N aqueous sodium hydroxide, 100 cc. water and 200 cc. methylated spirit. The alkaline mixture is filtered and poured into 2 litres water containing 100 cc. 2 N aqueous hydrochloric acid. The precipitate was filtered off with suction and dried at 100° C. 50 g. crude 18α-keto-G.A. are obtained. Recrystallisation from glacial acetic acid and working up of the mother liquors gives about 30 g. pure 18α-keto-G.A. of M.P. 328–9° C.; $[\alpha]_D^{20} = +125°$ in chloroform (C=0.8).

*Example 4.—Preparation of 3,11-Diketo-18α-Olean-12-En-20-Carboxylic Acid (18α-Keto-G.A.) (IX)*

18β-keto G.A. which may be prepared as described in Example 1, is isomerised by heating for a period of about 30 hours in a 10% solution of potassium hydroxide in n-propanol. In this way there is obtained 18α-keto G.A. (IX). Here again the product is obtained in a much higher yield and in a purer state than the product prepared by the method described by Logemann et al.

*Example 5.—Preparation of 2-Bromo-3,11-Diketo-18β-Olean-12-Ene-20-Carboxylic Acid (Monobromo-18β-Keto G.A.) (V)*

20 cc. of a molar solution of bromine in acetic acid is slowly added to 9.4 g. 18β-keto G.A. in 300 cc. glacial acetic acid at room temperature. The mixture is allowed to stand for 30 minutes and 500 cc. cold water then added slowly. The resulting precipitate is filtered off and dried in vacuo at room temperature. 10.5 g. crude monobromo-18β-keto-G.A. are obtained. The crude material is purified by dissolving in cold acetone, adding methanol and allowing the solution to evaporate at room temperature. Recrystallisation gives colourless needles of M.P. 240° C.; $[\alpha]_D^{20} = +180°$ in chloroform (C=0.2).

*Analysis.*—$C_{30}H_{43}O_4Br$. Calculated C=65.80; H=7.92; Br=14.59. Found C=66.30; H=8.01; Br=15.25. The solid decomposes on standing and turns pale brown.

In the same manner, 2-bromo-3,11-dikto-18α-olean-12-en-20-carboxylic acid (monobromo-18α-keto G.A. (XI) may be prepared from 18α-keto G.A. (IX).

*Example 6.—Preparation of 2,12,13-Tribromo-3,11-Diketo-18α-Olean - 20 - Carboxylic Acid (Tribromo-18β-G.A.) (II)*

40 cc. of a molar solution of bromine in acetic acid is slowly added to 9.4 g. 18β-keto-G.A. in 300 cc. glacial acetic acid at room temperature. The mixture is left for 30 minutes and 500 cc. cold water then added slowly. The resulting precipitate is filtered off and dried at room temperature in vacuo. 12 g. of crude material is obtained. The substance is purified by dissolving it in a mixture of chloroform and methanol and allowing the solution to evaporate. Colourless needles are obtained at M.P. 255–6° C. The substance slowly decomposes on standing.

*Analysis.*—$C_{30}H_{43}O_4Br_3$. Calculated Br=33.89%. Found Br=32.08%. In this tribromo compound, bromine is substituted in the 2-position and also added to the 12- and 13-positions, the 12,13 double bond being thereby eliminated.

18α-keto G.A. (IX) may be tribrominated in the same manner and, in this case, the product will be the same as that obtained by the tribromination of 18β-keto G.A. i.e. compound II. When tribromo-18β-keto G.A. is recrystallised from a solvent, such as glacial acetic acid or methanol, dehydrobromination apparently takes place at the 12,13 and 18,19 positions to give 2-bromo-3,11-diketo-olean-12,18-diene-20-carboxylic acid, i.e. monobromo-Δ¹⁸-keto-G.A. This substance crystallises from acetic acid as colourless plates of M.P. 272–274° C.

*Analysis.*—Bromine (found) 14.55%; (calc.) 14.66%.

*Example 7.—Preparation of 3,11-Diketo-18β-Olean-1,12-Dien-20-Carboxylic Acid (Δ¹-18β-Keto G.A.) (VI)*

11.0 g. pure monobromo-18β-keto-G.A. are mixed with 75 cc. dimethyl formamide and 25 cc. quinaldine and the golden solution obtained boiled in an atmosphere of nitrogen for 4 hours. The dark green reaction mixture is poured into a mixture of 20 cc. concentrated hydrochloric acid and 200 cc. water and the resulting precipitate filtered off, washed thoroughly with water and dried on a steam bath. The crude material thus obtained is crystallised by dissolving in a mixture of acetone and benzene and evaporating to low bulk. Pure $\Delta^1$-18β-keto-G.A. of M.P. 291–2° C. crystallises in the form of colourless rhomboids; $[\alpha]_D^{20} = +233°$ in chloroform B.P. (C=2); $\alpha_D^{20} = 4.68°$ (±0.01°) (2 dm.).

Analysis.—$C_{30}H_{42}O_4$. Calc.: C 77.21; H 9.07. Found: C 77.20; H 9.14.

Using the same method, monobromo-18α-keto-G.A. gives $\Delta^1$-18α-keto-G.A. in the form of colourless plates of M.P. 333–4° C., $[\alpha]_D^{20} = +146°$ in chloroform (C=1.6): $\alpha_D^{20} = +2.41°$ (±0.01°) (2 dm.).

*Example 8.—Preparation of 3,11-Diketo-Olean-1,12,18-Trien-20-Carboxylic Acid ($\Delta^{1,18}$-Keto-G.A.) (III)*

12 g. tribromo-18β-keto G.A., which may be prepared as described in Example 6, is mixed with 75 cc. dimethyl formamide and 25 cc. quinaldine and the golden solution obtained boiled in an atmosphere of nitrogen for 4 hours. The crude green mixture obtained is poured into a mixture of 20 cc. concentrated hydrochloric acid and 200 cc. water and the resulting precipitate filtered off, washed thoroughly with water and dried on a steam bath. The crude material is recrystallised by dissolving in methanolic chloroform and evaporating to a small bulk; M.P. 306–7° C. The same product is obtained if, instead of $\Delta^{1,18}$-keto-G.A. there is used 11 g. monobromo-$\Delta^{18}$-keto-G.A.

*Example 9.—Preparation of 3,11-Diketo-18β-Olean-1,12-Dien-20-Carboxylic Acid Chloride ($\Delta^1$-18β-Keto G.A. Chloride) (VIa)*

$\Delta^1$-18β-keto G.A. which may be prepared in the manner described in Example 7, is treated with oxalyl chloride at an elevated temperature. In this manner, the 20-carboxylic acid group is converted into an acid chloride group.

In the same manner, 18β-keto G.A., 18α-keto G.A., $\Delta^1$-18α-keto G.A. and $\Delta^{1,18}$ G.A. may be converted into the corresponding 20-acid chlorides.

*Example 10.—Preparation of 3,11-Diketo-20-Ethinyl-Carbonyl-18β-Olean - 1,12-Diene (Ethinylketo-$\Delta^1$-18β-Keto G.A.) (VII)*

The acid chloride of $\Delta^1$-18β-keto G.A., which may be prepared in the manner described in Example 9, is caused to react with one molecular equivalent of sodium acetylide in the presence of benzene. In this manner, the acid chloride group is converted into an ethinyl keto group giving rise to ethinyl keto $\Delta^1$-18β-keto G.A. (VII).

In the same manner, 3,11-diketo-20-(ethinyl-carbonyl)-olean-1,12,18-triene(ethinylketo - $\Delta^{1,18}$ - keto G.A. (IV) may be prepared from the acid chloride of $\Delta^{1,18}$-keto-G.A.(IIIa), 3,11-diketo-20-(ethinyl-carbonyl)18β-olean-12-ene (ethinylketo-18β-keto G.A.) (VIII) from the acid chloride of 18β-keto G.A. (Ia), 3,11-diketo-20-(ethinyl-carbonyl)-18α-olean-12-ene(ethinylketo-18α-keto (G.A.) (X) from the acid chloride of 18α-keto G.A. (IXa) and 3,11-diketo-20-(ethinyl-carbonyl)-18α-olean - 1,12 - diene (ethinyl-keto-$\Delta^1$-18α-keto G.A.) (XIII) from the acid chloride of $\Delta^1$-18α-keto G.A. (XIIa).

*Example 11.—Preparation of 3,11-Diketo-20-(ω-Acetoxy-Acetyl)-Olean-1,12,18-Triene(Acetoacetyl-$\Delta^{1,18}$ - Keto G.A.) (XIV)*

The 20-acid chloride $\Delta^{1,18}$-keto G.A. (IIIa), which may be prepared in the manner described in Example 9, is caused to react with diazomethane to give the corresponding diazoketone which, in turn, is caused to react with acetic acid in the presence of potassium acetate. In this manner, the 20-acid chloride is converted into the corresponding acetoxy acetyl derivative (XIV). In the same manner, 3,11-diketo-20-(ω-acetoxyacetyl)-18β-olean-1,12-diene (acetoacetyl-$\Delta^1$-18β-keto G.A.) (XV) may be prepared from the acid chloride of $\Delta^1$-18β-keto G.A. (VIa) and 3,11-diketo-20-(ω-acetoxyacetyl) - 18α - olean-1,12-diene (acetoacetyl-$\Delta^1$-18α-keto G.A.) (XVI) from the acid chloride of $\Delta^1$-18α-keto G.A.

It is to be understood that all the new derivatives of glycyrrhetinic acid which come within the scope of the present invention may be solubilised by known methods. Of special utility for this purpose there may be mentioned Girard's Reagent 'T'

However, similar hydrazine ammonium compounds may also be used. Furthermore, in addition to the new compounds within the purview of the present application, it is also possible to solubilise in this manner, 3, 11-diketo 20-(α-acetoxy-acetyl)-18α- and 18β-olean-12-ene, these two compounds having already been described by Logemann et al. (v. supra).

What we claim is:
1. 3,11-diketo-18β-olean-1,12-dien-20-carboxylic acid.
2. 3,11-diketo-18α-olean-1,12-dien-20-carboxylic acid.
3. 3,11-diketo-olean-1,12,18-trien-20-carboxylic acid.
4. 3,11-diketo-20-(ethinyl - carbonyl)-18α-olean-1,12-diene.
5. 3,11-diketo-20-(ethinyl - carbonyl) - olean-1,12,18-triene.
6. 3,11-diketo-20-(ethinyl - carbonyl)-18β - olean-12-ene.
7. 3,11-diketo-20-(ethinyl - carbonyl)-18α-olean - 12-ene.
8. 3,11-diketo-20-(ethinyl - carbonyl)-18β-olean-1,12-diene.
9. 3,11-diketo-20-(ω-acetoxy acetyl)-olean-1,12,18-triene.
10. 3,11-diketo-20-(ω-acetoxyacetyl) - 18β-olean-1,12-diene.
11. 3,11-diketo-20-(ω-acetoxyacetyl) - 18α-olean-1,12-diene.
12. A process for the preparation of a 3,11-diketo-18α-olean-1,12-dien-20-carboxylic acid, which comprises subjecting the corresponding 3,11-diketo-18α-olean-12-en-20-carboxylic acid to the action of bromine until one bromine atom has added on, thereby yielding the corresponding 2-bromo compound, and subjecting the latter to the action of a dehydrobrominating agent, whereby the corresponding 1,12-diene is produced.
13. A process for the preparation of a 3,11-diketo-18β-olean-1,12-dien-20-carboxylic acid, which comprises subjecting the corresponding 3,11-diketo-18β-olean-12-en-20-carboxylic acid to the action of bromine until one bromine atom has added on, thereby yielding the corresponding 2-bromo compound, and subjecting the latter to the action of a dehydrobrominating agent, whereby the corresponding 1,12-diene is produced.
14. A process for the preparation of a 3,11-diketo18-olean-1,12,18-triene-20-carboxylic acid, which comprises subjecting the corresponding 3,11-diketo-18α-olean-12-en-20-carboxylic acid to the action of bromine until three bromine atoms have added on, thereby yielding the corresponding 2,12,13-tribromo compound, and subjecting the latter to the action of a dehydrobrominating agent, whereby the corresponding 1,12,18-triene is produced.
15. A process for the preparation of a 3,11-diketo-18-olean-1,12,18-triene-20-carboxylic acid, which comprises subjecting the corresponding 3,11-diketo-18β-olean-12-en-20-carboxylic acid to the action of bromine until three bromine atoms have added on, thereby yielding the corresponding 2,12,13-tribromo compound, and subjecting the latter to the action of a dehydrobrominating agent, whereby the corresponding 1,12,18-triene is produced.

16. A process for the preparation of a compound of the formula

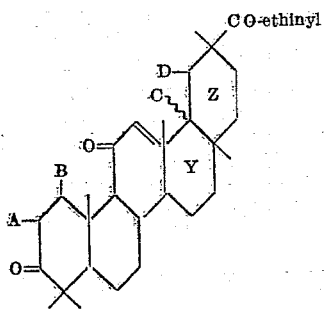

wherein the moiety

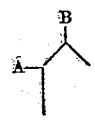

is a member selected from the group consisting of

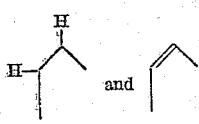

the moiety

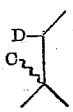

is a member selected from the group consisting of

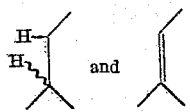

and the rings Y and Z being in one of the relationships cis and trans with respect to each other, which comprises subjecting the corresponding 20-COOH compound to the action of a chlorinating agent, whereby the corresponding acid chloride results, and subjecting the said acid chloride to the action of an ethinylating agent, whereby the desired ethinyl-substituted compound is obtained.

17. A process according to claim 16, wherein the chlorinating agent is selected from the group consisting of thionyl chloride and oxalyl chloride.

18. A process according to claim 17, wherein the ethinylating agent is sodium acetylide.

19. A process according to claim 16, wherein the ethinylating agent is sodium acetylide.

20. A process for the preparation of a compound of the formula

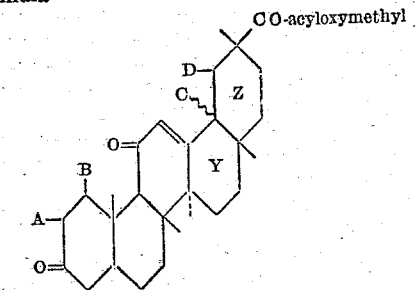

wherein the moiety

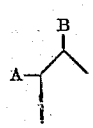

is a member selected from the group consisting of

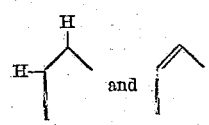

the moiety

is a member selected from the group consisting of

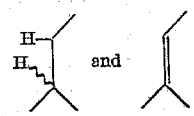

and the rings Y and Z being in one of the relationships cis and trans with respect to each other, which comprises subjecting the corresponding 20-acid chloride to the action of diazomethane, and then reacting the resultant diazoketone with the corresponding carboxylic acid.

21. A process according to claim 20, wherein the carboxylic acid is acetic acid.

References Cited in the file of this patent

Wagner et al.: "Synthetic Organic Chemistry," John Wiley & Sons, Inc., New York (1953), page 80.

Logermann et al.: "Chemische Berichte," 90, 601–4 (1957).

Fieser et al.: "Steroids," Reinhold Publishing Corp., New York (1959), pages 280 to 294, 557 and 623.